Patented Mar. 29, 1938

2,112,302

UNITED STATES PATENT OFFICE 2,112,302

PLASTER WITH RETARDED SUCTION EFFECT

John P. C. Peter, Westfield, N. J., assignor, by mesne assignments, to American Cyanamid & Chemical Corporation, a corporation of Delaware No Drawing. Application December 13, 1932, Serial No. 646,965. Renewed October 12, 1937

4 Claims. (Cl. 106—24)

The present invention relates to a method of controlling suction, that is, rate of absorption of water, of plaster having a calcareous base, and to the plaster so produced.

Finished wall plaster is usually made up of several coats or layers. The first coat or the one applied to the base or backing is called the "scratch" coat. The second or "browning" or "brown" coat is applied over the scratch coat and the third or "finish" coat is applied over the brown coat. The scratch and brown coats consist of a calcareous binder such as calcined gypsum, lime, Portland cement or magnesia with admixtures of sand, hair or fiber and water. The brown coat usually contains less cementitious material than the scratch coat and may contain less hair or fiber. After the application of the scratch and brown coats and when the latter is dry or nearly so, the finish coat is applied. The usual finish coat consists of lime and plaster of Paris with or without an admixture of sand and water.

It is well recognized that many times the base coat which may be either a scratch or brown coat or both, is so porous that it has a tendency to rapidly absorb the water from the plastic finish coat as it is applied, to an extent that robs the finish coat of the water necessary to permit it to set into a proper hard finish. Not only may this abstraction of water result in cracks, but it may even result in the falling off of large areas of the finish coat due to the fact that such plaster has not completely hydrated and has not effectively bonded to the base coat.

From the foregoing it will be apparent that the rate of absorption of plaster is very important. In some cases a plaster with a relatively high rate of absorption is desired, while in others a relatively low rate of absorption is desired. The present invention, therefore, contemplates the control of the water absorption ability of plaster hereinafter referred to as suction, so as to produce a wall plaster with any desired practical rate of absorption, dependent upon the work in hand. In all instances the rate of absorption should be such as will permit the finish coat or the top coat, as the case may be, to retain its water for a sufficient length of time to cause a proper set and efficient bond with the base coat.

Many proposals have been made for controlling this rate of absorption or suction in wall plasters but they have proved to be either ineffective or erratic in operation and many times consist in the addition to the plaster of materials either expensive in themselves and hence prohibitive, or of such a nature as will act as retarders or accelerators in the set thereof, which of course is detrimental in many instances.

The principal object of the invention, therefore, is the control of suction in a wall plaster to accomplish the above desirable effects by the addition to such plasters of a material which is initially cheap, which does not involve any intricate method of manufacture, and which may be produced in a uniform grade and quality.

It has been discovered that the above objects may be readily accomplished by mixing with the plaster either as it is bagged for shipment to the consumer, or at some prior stage in the manufacture thereof, or by the consumer himself at the time the plaster is mixed, requisite amounts of what will hereinafter be termed as a limed rosin. This material may be prepared generally by mixing with molten rosin an excess amount of lime, that is, with a quantity of lime more than sufficient to normally combine with rosin as in the commercial manufacture of so called limed rosin. A detailed method of preparation of this material follows.

Rosin of any desired grade is thrown into a kettle heated by any desired means, until a lime reacting temperature has been reached. This has been found to be substantially 230° C. At this point a hydrated lime containing minimum amounts of magnesium oxide is slowly added. The material should be free from lumps and it has been found that sifting this ingredient into the molten rosin while agitating or stirring the latter is very satisfactory. An exothermic reaction occurs immediately and hence the lime additions should be made slowly in order to prevent any undue rise in temperature and hence volatilization or vaporization of the rosin or its ingredients. It has been found that the total hydrated lime addition should be approximately 9% of the weight of the rosin. It is to be noted that theoretically only approximately 7% of lime will combine with rosin under the ordinary manufacturing procedure. It has been found, however, that by the use of an excess quantity of lime a characteristic is developed in the final product which makes it particularly applicable to the purpose in hand, and that this characteristic is either less effective or totally absent from limed rosin prepared with 7% lime.

After the total quantity of hydrated lime has been added, and this time element may vary between wide limits, dependent upon the size of the batch being treated, and may run somewhere between thirty minutes to two hours, the temperature of the batch will have risen slightly above the initial temperature of approximately 230° C.

A temperature of 260° C. has been found to be the usual one at the end of the lime addition. This temperature should be held for a period of time just short of the gelling point of the mix. This gelling point is a rather peculiar property of molten limed rosin and occurs even when the theoretical amount of lime is added and the molten mass held at a reaction temperature for too long a time. If the gelling point is reached, the batch is completely ruined and is unfit for the purpose in hand. The exact gelling point can only be determined by extensive experiment. It has been found that if the molten batch is held from fifteen to thirty minutes dependent upon the size of the batch, this will avoid the undesirable gelling effect above noted.

At this point the batch is run onto a surface such as a concrete floor or the like, to a depth of from 2 to 3 inches and permitted to thoroughly cool. Of course, the heating of the batch continues for a considerable period after the molten material is run from the kettles onto the cooling floor. This time of heating must be figured in preventing the gel, or otherwise this undesirable point will be reached on the cooling floor, which is equally as bad as being reached in the kettle. Obviously the reaction between the lime and the rosin continues for a certain length of time even on the cooling floor and certainly until the mass has cooled below a reaction temperature. It has been found desirable to permit this mass to remain on the cooling floor for a period as long as two days in order to completely cool and solidify.

An inspection of the solidified product in the kettle shows that this material is of a color varying from light to dark brown, slightly opaque and contains visible though very small aggregates of what is probably unreacted lime thoroughly disseminated therethrough. The product has a decided glassy rosin-like appearance, though easily friable in the fingers, unlike rosin This product may then be broken up into small lumps and stored until ready for use. The material appears to be stable in the form of large lumps, although if pulverized or ground, there appears to be such intimate contact between the individual particles that a reaction or oxidation takes place with the development of a considerable amount of exothermic heat. This reaction does not occur when the material is stored in comparatively large lumps, say from one to two inches in diameter.

When the material is ready to be used by incorporation in a calcareous plaster, the product is ground with an equal weight of calcined or hydrated gypsum. This added material appears to be in the nature of an inert diluent which effectively spaces apart the particles of the limed rosin to such an extent that no reaction will occur therein even though the mixed and ground product is stored for long periods of time. The ground diluted product will not lump in the storage receptacle as will the ground limed rosin before dilution.

Grinding to the extent that 85% of the product will pass a 100 mesh sieve has been found to be a satisfactory fineness.

As applied to plasters having a calcareous base, such as gypsum or lime, or with a base of magnesia or cement or admixtures thereof, a preferred embodiment of the invention consists in mixing therewith a sufficient amount of limed rosin so that when such plaster has been gauged with water, permitted to set and dry into a horizontal surface, .2 cc. of water when applied thereto will completely disappear and the surface of the plaster becomes dull in not less than fifteen seconds. If .2 cc. of water does disappear and the surface of the plaster becomes dull in less than fifteen seconds, this indicates a too rapid rate of water absorption, with the indication that plaster of this character is open to the objections above enumerated. A satisfactory plaster for optimum purposes is one in which .2 cc. of water as above applied will disappear in approximately thirty seconds. A plaster having this degree of suction has been found to be satisfactory for most purposes. A minimum and maximum range is probably from twenty seconds to one and one-half minutes. Beyond this maximum, suction has been reduced to a point which will seriously interfere with the time of set of the usual finish coat, which is undesirable by reason of the fact that it delays the finishing operation. On the other hand, with certain special finishes it may be desirable to not have the .2 cc. of water absorbed in less than one hour.

As applied to plasters having a gypsum base, I have found that the above results may be secured by admixing therewith from one-half to thirty pounds of limed rosin per ton of gypsum in the composition. Where lime or magnesia is used as the plaster base, the maximum amount of limed rosin will have to be doubled, that is, up to sixty pounds per ton of lime or magnesia base.

As an optimum proportion of suction reducing material in a gypsum plaster, I prefer to use approximately one and one-half pounds of limed rosin per ton of gypsum entering into the composition.

In any of the above proportions, the resultant product has lower porosity than if the limed rosin herein described were not used. As a result the present product is more waterproof than plaster not so treated.

When limed rosin containing an excess amount of lime is used in the above compositions, a plastered surface is obtained, the appearance and surface hardness of which is superior to plastered walls in which other materials are used to control the rate of absorption.

Experiments have demonstrated that an admixture of molten rosin with lime where the latter is not used in excess is inferior to the limed rosin here proposed. It has also been determined that the desired effect cannot be obtained by merely adding an excess amount of lime to calcium resinate however prepared, but it seems important to produce a limed rosin as above outlined if optimum effects are to be secured.

In the claims where the words "limed rosin" are used, it is to be understood that this means a product in which an excess amount of lime was initially used with rosin in the preparation of the suction reducing material.

I claim:—

1. A process of producing a calcareous base plaster of modified porosity and having a predetermined water absorption figure, which comprises uniformly incorporating from ½ to 60 lbs. of the dry reaction product of molten rosin and excess calcium oxide, per ton of calcareous base, with a calcareous base, gaging with water and setting in the usual manner.

2. A process of producing a calcareous base plaster of modified porosity and having a predetermined water absorption figure which comprises uniformly incorporating substantially one and one-half lbs. of the dry reaction product of molten rosin and more than 7% calcium oxide, per ton of calcareous base, with a calcareous base, gaging with water and setting in the usual manner.

3. As a new product, a set mass of calcareous plaster of modified porosity and having a predetermined water absorption figure characterized by a uniformly distributed content of from ½ to 60 lbs. per ton of calcareous base, of the dry reaction product of molten rosin and substantially 9% of calcium oxide by weight.

4. As a new product, a dry mix from which a calcareous plaster may be prepared, said mix being predominately calcined gypsum and from ½ to 30 lbs. of the dried, powdered, reaction product of molten rosin with substantially 9% by weight of calcium oxide, per ton of calcareous base.

JOHN P. C. PETER.